United States Patent
Hauzenberger

(10) Patent No.: US 7,225,997 B2
(45) Date of Patent: Jun. 5, 2007

(54) DISTRIBUTOR BOTTOM FOR THE DISTRIBUTION OF A GAS CHARGED WITH FINE SOLID PARTICLES

(75) Inventor: Franz Hauzenberger, Linz (AU)

(73) Assignees: Voest-Alpine Industrieanlagenbau GmbH & Co. (AT); Pohang Iron & Steel Co., Ltd. (KR); Research Institute of Industrial Science & Technology, Incorporated Foundation (KR)

( * ) Notice: Subject to any disclaimer, the term of this patent is extended or adjusted under 35 U.S.C. 154(b) by 267 days.

(21) Appl. No.: 10/503,198

(22) PCT Filed: Feb. 10, 2003

(86) PCT No.: PCT/EP03/01279

§ 371 (c)(1),
(2), (4) Date: Jul. 30, 2004

(87) PCT Pub. No.: WO03/068380

PCT Pub. Date: Aug. 21, 2003

(65) Prior Publication Data

US 2005/0089808 A1 Apr. 28, 2005

(30) Foreign Application Priority Data

Feb. 14, 2002 (AT) ................................. A 235/2002

(51) Int. Cl.
*B05B 1/28* (2006.01)
*B05B 15/02* (2006.01)
*F23D 11/34* (2006.01)

(52) U.S. Cl. ...................... 239/104; 239/106; 239/118; 239/123

(58) Field of Classification Search ................ 239/104, 239/106, 114, 123, 118; 173/100, 101, 99, 173/117, 124, 131
See application file for complete search history.

(56) References Cited

U.S. PATENT DOCUMENTS 4,221,573 A * 9/1980 Hankins ........................ 96/35

(Continued)

FOREIGN PATENT DOCUMENTS

GB 974 728 11/1964
JP 04 144917 5/1992

OTHER PUBLICATIONS

Database WPI.

(Continued)

*Primary Examiner*—Davis Hwu
(74) *Attorney, Agent, or Firm*—Ostrolenk, Faber, Gerb & Softten, LLP

(57) ABSTRACT

A nozzle distributor base for distributing a gas which is laden with fine solids particles, preferably for use in a fluidized-bed unit, in particular for the reduction of metal oxide-containing solids particles. At least one movable cleaning device on the distributor base reduces the formation of deposits on the distributor base or the nozzles thereof or at least partially removes deposits which have already formed. Elements in the distributor base, like chains, ropes or movable rods, clean the distributor base by direct mechanical striking action on the distributor base and/or the nozzles of the nozzle distributor base. A method for reducing the formation of deposits and/or for at least partially removing deposits on a distributor base uses the striking action.

10 Claims, 3 Drawing Sheets

U.S. PATENT DOCUMENTS 4,283,012 A * 8/1981 Hanson ...................... 239/118
4,421,067 A * 12/1983 Krowech .................... 122/390
4,454,998 A * 6/1984 Sarser ........................ 242/533
6,293,735 B1 9/2001 Klobucar et al.
6,460,628 B1 * 10/2002 Day et al. ................... 173/100

OTHER PUBLICATIONS

Section Ch, Week 200274, Derwent Publications Ltd., London, GB. AN 2002-688603 XP002244025.
& KR 2002 037 971 A (POSCO), May 23, 2002.

* cited by examiner

DISTRIBUTOR BOTTOM FOR THE DISTRIBUTION OF A GAS CHARGED WITH FINE SOLID PARTICLES

BACKGROUND OF THE INVENTION

The invention relates to a distributor base, in particular nozzle distributor base, for distributing a gas which is laden with fine solids particles, preferably for use in a fluidized-bed unit, in particular for the reduction of metal oxide-containing solids particles, at least one movable cleaning device being arranged on the distributor base, which makes it possible to reduce the formation of deposits on the distributor base, in particular on the nozzles of a nozzle distributor base, while the distributor base is operating and/or to at least partially remove deposits which have already formed. The invention also relates to a method for reducing the formation of deposits and/or for at least partially removing deposits on a distributor base.

The person skilled in the art already knows how to remove deposits from a nozzle distributor base by means of a movable cleaning device from publication EP 0 444 614 A2. The installation and method taught by that document have proven complex in practice and require high levels of technical and financial outlay.

SUMMARY OF THE INVENTION

Therefore, it is an object of the present invention to further develop an apparatus and a method of the invention to prevent formation or to remove particle deposits from a distributor base or nozzle openings through the base, wherein the base is used in a fluidized bed unit for distribution of gas laden with solid particles, so that it is possible to realize an economical and reliable method and a corresponding apparatus.

Simple and expedient cleaning of the nozzle distributor base is ensured by the fact that the cleaning device has a means for cleaning the distributor base by means of a direct mechanical, in particular striking, action on the distributor base, in particular on the nozzles of a nozzle distributor base.

According to one particular embodiment of the apparatus according to the invention, the means for cleaning the distributor base is designed in such a manner that the means for cleaning the distributor base absorbs a kinetic energy which is sufficient to achieve the cleaning action from the flow of the gas.

According to a particular embodiment of the apparatus according to the invention, the means for cleaning the distributor base is a rope and/or a chain and/or a movably mounted rod.

According to a particular embodiment of the apparatus according to the invention, the means for cleaning the distributor base is arranged on the distributor base, in particular in at least one of the nozzles of the distributor base.

According to one particular embodiment of the apparatus according to the invention, the cleaning device is present for at least one nozzle and may be secured in the nozzle and/or on the distributor base and/or elsewhere in the fluidized-bed unit.

According to one particular embodiment of the apparatus according to the invention, the cleaning device is secured next to and/or in and/or above and/or below the nozzle.

According to one particular embodiment, the invention is characterized by a nozzle distributor base for distributing a gas which is laden with fine solids particles, preferably for use in a fluidized-bed unit for the reduction of metal oxide-containing solids particles, at least one movable cleaning device being arranged on the nozzle distributor base, which makes it possible to reduce the formation of deposits in the nozzles and/or on the distributor base and/or to at least partially remove deposits which have already formed, in which case the cleaning device is a rope and/or a chain and/or a movably mounted rod arranged, for example, on the nozzle distributor base and/or in the nozzle itself, for at least one of the nozzles.

Furthermore, the invention comprises a method of preventing formation or removing deposits formed on the distributor base by direct mechanical action or striking action on the distributor base or the nozzles therein or on the deposits.

According to one particular embodiment of the method according to the invention, the cleaning device is supplied with sufficient kinetic energy to achieve the cleaning action by the flow of the gas.

According to one particular embodiment of the method according to the invention, the nozzle distributor base is made to vibrate by the cleaning device.

According to one particular embodiment of the method according to the invention, the cleaning device is at least partially arranged, in particular secured, in at least one of the nozzles of the distributor base.

Nozzles of gas distributor bases, as are used, for example, in fluidized-bed technology, which have a dust-laden gas flowing to them, tend to become blocked as a result of caking of the dust entrained by the gas. This entails high maintenance costs for cleaning the nozzles.

Therefore, according to one particular embodiment of the invention, one or more chains, ropes or movably mounted rods, for example rods which are secured by a chain and/or a rope, or similar items are secured in the nozzle and/or above the nozzle and/or below the nozzle and/or next to the nozzle. The objects are set in motion by the turbulence of the flowing gas and knock adhering particles off the nozzles or make the nozzles vibrate, so that adhering particles flake off and/or the caking phenomenon is reduced.

BRIEF DESCRIPTION OF THE DRAWINGS

Various embodiments of the subject matter of the invention are illustrated on the basis of a number of non-limiting, diagrammatic drawings, in which.

DESCRIPTION OF PREFERRED EMBODIMENTS

Figure 1:
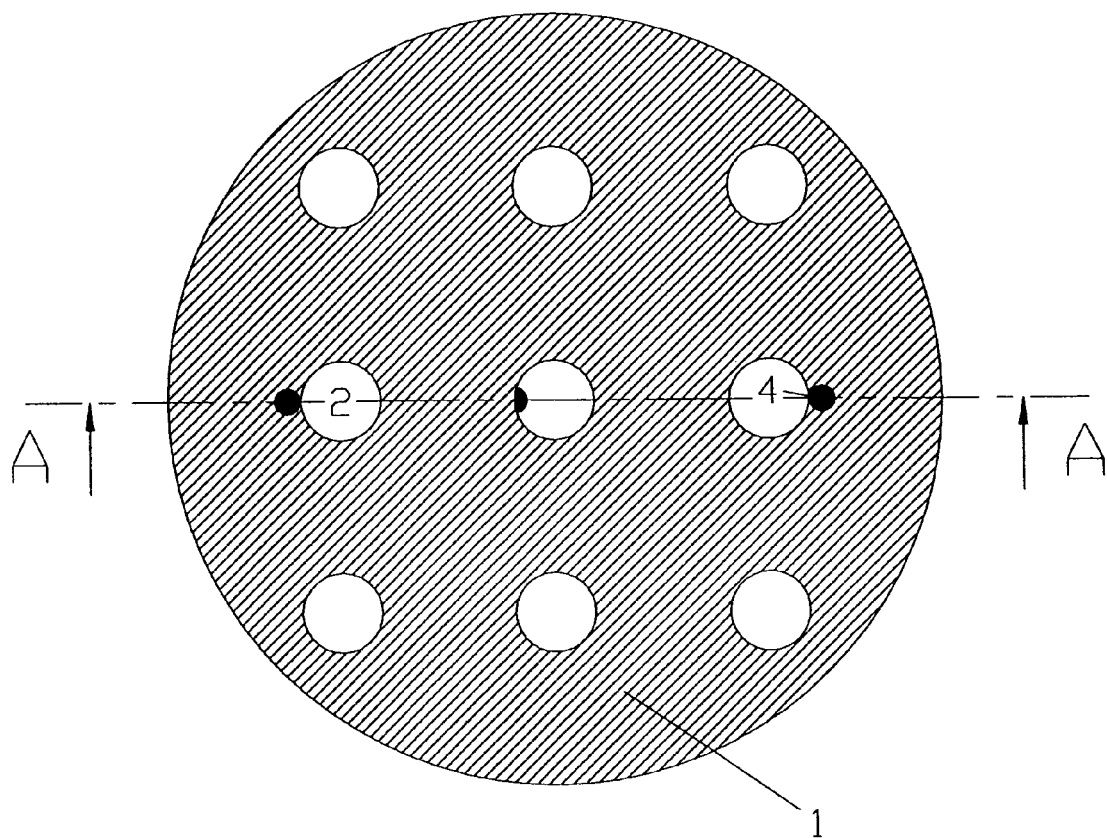
FIG. 1 diagrammatically depicts a nozzle distributor base.
Figure 1A:
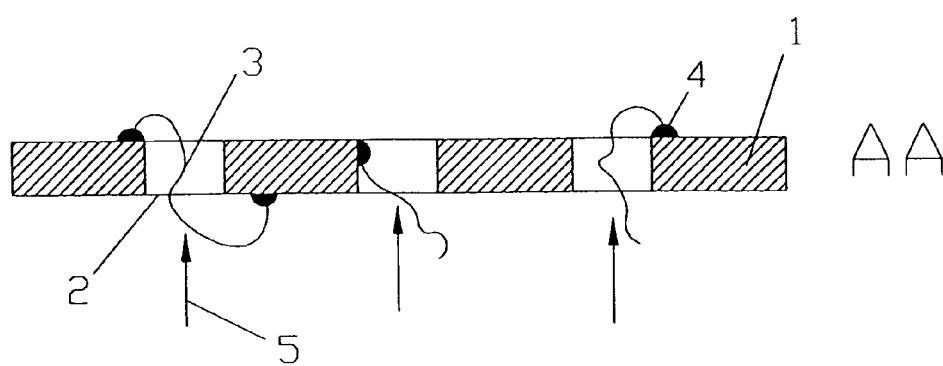
FIG. 1A shows a cross section of FIG. 1 at A—A.

FIGS. 1 and 1A illustrates a nozzle distributor base 1 which has a number of nozzles 2 passing through the base. Cleaning devices, in particular chains 3, are arranged on the nozzle distributor base, fixed to the nozzle distributor base at suitable securing points 4. The flow 5 through the nozzles moves the chains 3, so that they strike the nozzle distributor base 1 and/or the nozzles 2. This mechanical action removes caked deposits from the nozzle distributor base 1. Although chains are shown, the drawing also illustrates ropes. A movably mounted rod may be used.

According to an additional embodiment of the invention, the nozzle distributor base is made to vibrate by the cleaning devices, so that caking is further reduced. For the sake of simplicity, FIG. 1 illustrates only cleaning devices at selected nozzles. The cleaning device can be secured to the nozzle distributor base in any desired way.

Figure 2:
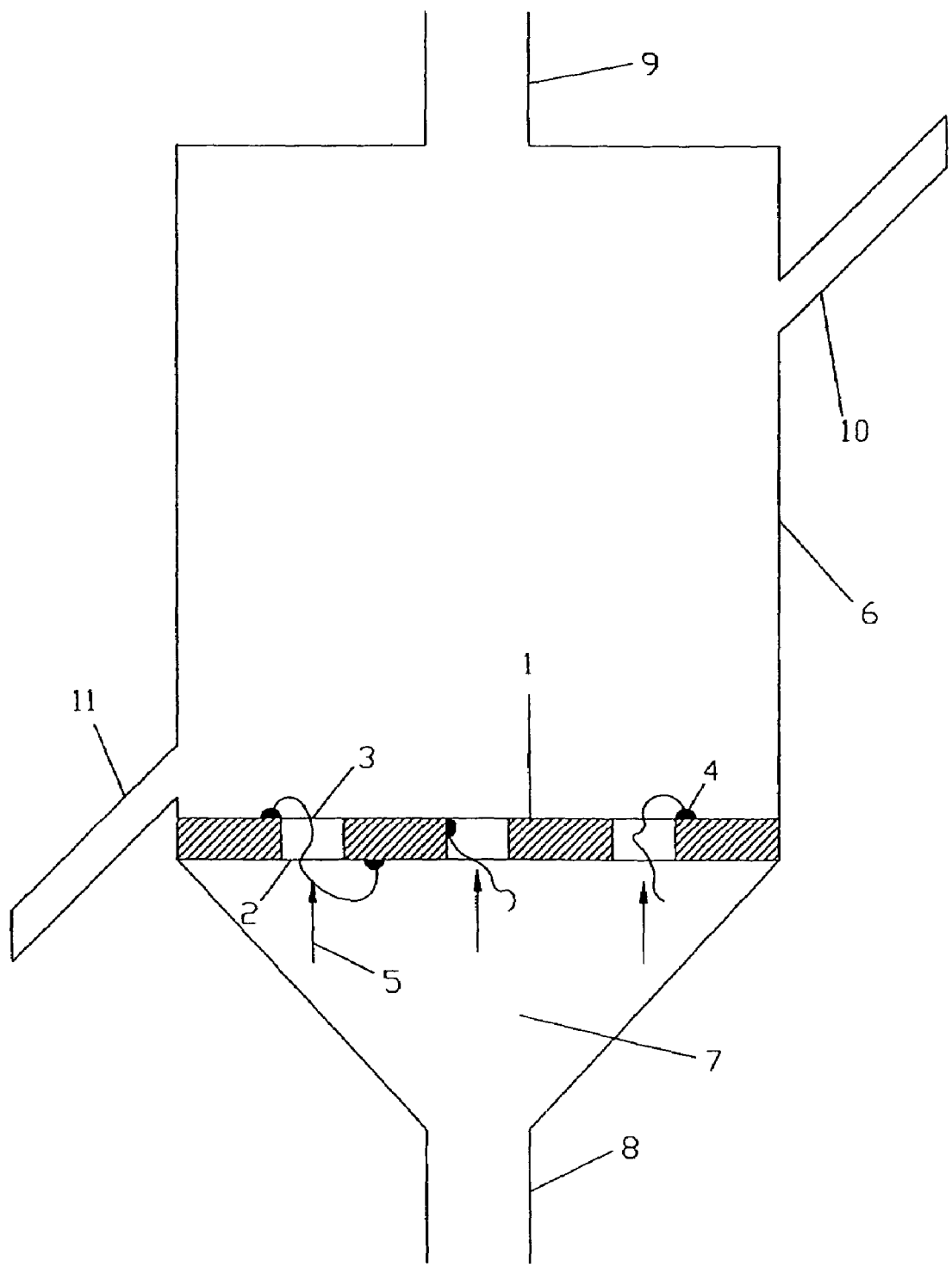
FIG. 2 shows a fluidized-bed unit with a nozzle distributor base.

FIG. 2 once again shows the nozzle distributor base 1, in this case in a fluidized-bed unit 6, for example for the reduction of iron ore in fine-particle form. Beneath the nozzle distributor base 1 there is a blast chamber 7, through which the reaction gas is introduced via a gas feed line 8. After the reaction has taken place in the reaction chamber, the gas is discharged again from the fluidized-bed unit via a discharge line 9. Furthermore, the charge material in solid form is fed to the fluidized-bed unit via a feed line 10 and is discharged again via a discharge line 11.

Figure 3:
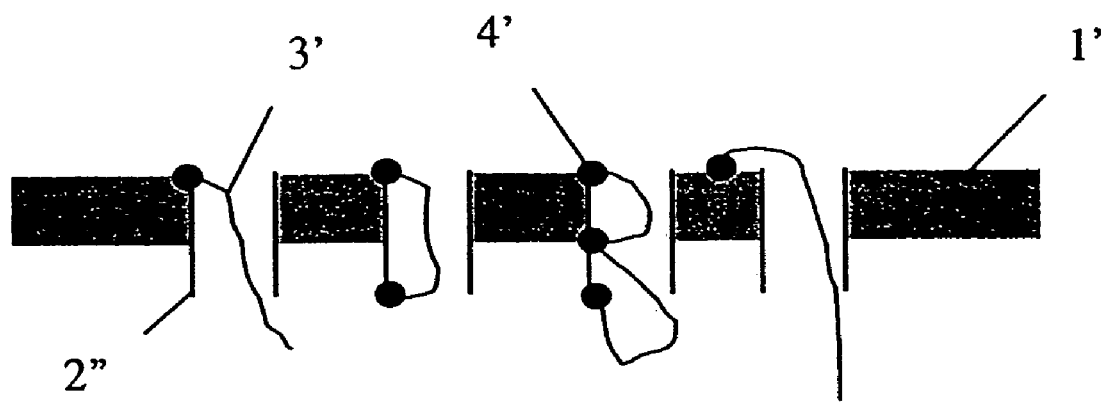
FIGS. 3 and 4 show various further embodiments which can be used to form a distributor base in accordance with the invention.
Figure 4:
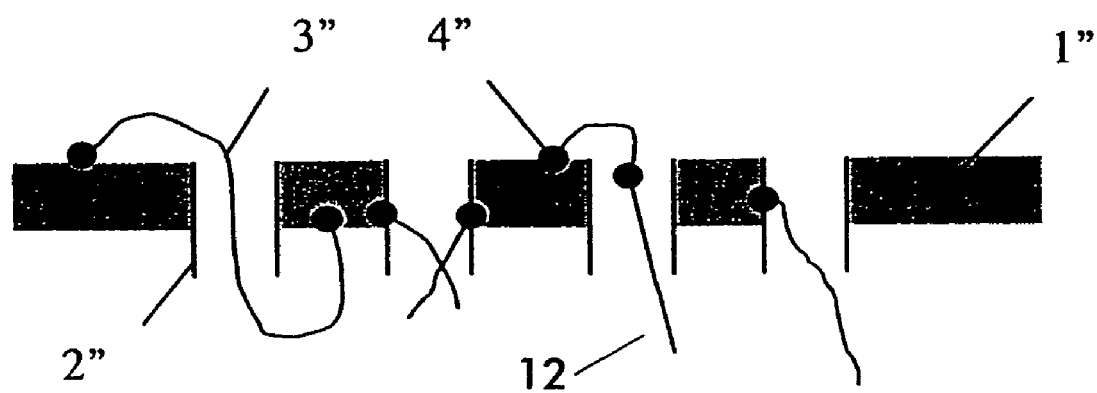

Finally, FIGS. 3 and 4 show various further exemplary embodiments for realizing distributor bases, which may in addition be combined with one another.

FIGS. 3 and 4 show a detailed illustration of various forms of attaching, in particular securing 4' or 4", means 3' or 3" for cleaning a distributor base to a distributor base 1' or 1", in particular to the nozzles 2' or 2" of a distributor base.

A movably mounted rod 12 is fixed to securing 4" in FIG. 4.

The invention claimed is:

1. A distributor base operable for distributing a gas laden with fine solids particles, including:
   a plurality of nozzles operative to provide a gas flow of the gas;
   at least one movable cleaning device arranged on the distributor base and operable to reduce the formation of deposits on the distributor base and on the nozzles of the nozzle distributor base, or to at least partially remove deposits which have already formed;
   the cleaning device including cleaning elements operable to clean the distributor base and its nozzles by at least one of a direct mechanical movement action or a striking action on at least one of the distributor base and the nozzles and arranged at a location to receive kinetic energy sufficient to achieve the at least one of the direct mechanical movement action or the striking action from the gas flow through the nozzles.

2. The distributor base as claimed in claim 1 wherein the cleaning elements each comprise a rope.

3. The distributor base as claimed in claim 1, wherein at least one element of the elements for cleaning the distributor base are arranged in the nozzles.

4. The distributor base of claim 3, wherein the least one of the cleaning elements is disposed in at least one of the nozzles of the distributor base.

5. The distributor base of claim 1, wherein the cleaning elements each comprise a chain.

6. The distributor base of claim 1, wherein the cleaning elements each comprise a movably mounted rod.

7. A fluidized bed unit for reduction of solid particles from a gas laden with solid particles, the unit comprising:
   a chamber;
   an inlet for the gas into the chamber from below; and
   an outlet from the chamber for gas above the inlet and a nozzle distributor base as claimed in claim 1 disposed in the chamber between the inlet and the outlet.

8. A method for reducing the formation of deposits and/or for at least partially removing deposits on a distributor base and on nozzles of the nozzle distributor base, including at least one movable cleaning device operable on the distributor base, the method comprising:
   passing particle laden gas through the nozzles; and
   cleaning the distributor base by at least one of a direct mechanical movement action or a striking action of the cleaning device on the distributor base or the nozzles or on the corresponding deposits at the nozzles, such that the passing of the particle laden gas through the nozzles provides sufficient kinetic energy to the cleaning device for the at least one of the direct mechanical movement action or the striking action.

9. The method as claimed in claim 8, further comprising vibrating the nozzle distributor base via the cleaning device.

10. The method as claimed claim 8, wherein the cleaning device is at least partially arranged in at least one of the nozzles of the distributor base.

* * * * *